United States Patent

Morikawa et al.

[11] Patent Number: 5,619,881
[45] Date of Patent: Apr. 15, 1997

[54] DOUBLE-SCISSORS CUTTER

[75] Inventors: Sumio Morikawa, Sakai; Noboru Nakayama; Nobuyuki Zakohji, both of Toyonaka, all of Japan

[73] Assignee: Ohyodo Diesel Co., Ltd., Osaka, Japan

[21] Appl. No.: 505,803

[22] Filed: Jul. 21, 1995

Related U.S. Application Data

[63] Continuation-in-part of Ser. No. 171,735, Dec. 22, 1993, abandoned.

[30] Foreign Application Priority Data

Jul. 16, 1993 [JP] Japan .................................. 5-176332

[51] Int. Cl.$^6$ .................................................. B21D 28/14
[52] U.S. Cl. .................. 72/330; 72/326; 30/134
[58] Field of Search ........................ 72/326, 325, 329, 72/330, 414; 83/176, 175; 30/134

[56] References Cited

U.S. PATENT DOCUMENTS

| | | | |
|---|---|---|---|
| 1,730,377 | 10/1929 | Northrup | 72/329 |
| 1,735,781 | 11/1929 | Nickerson | 72/329 |
| 2,990,871 | 7/1961 | Brickman | 72/326 |
| 3,380,281 | 4/1968 | Skinner | 72/330 |
| 4,192,170 | 3/1980 | Ferwagner | 72/414 |
| 5,146,683 | 9/1992 | Morikawa | 30/134 |

FOREIGN PATENT DOCUMENTS

| | | | |
|---|---|---|---|
| 0634242 | 1/1995 | European Pat. Off. . | |
| 4205781 | 9/1993 | Germany . | |
| 1026897 | 7/1983 | U.S.S.R. | 72/325 |
| 881010 | 11/1961 | United Kingdom | 72/414 |
| 1367639 | 9/1974 | United Kingdom | 72/329 |
| WO9305923 | 4/1993 | WIPO | 3/131 |

*Primary Examiner*—Daniel C. Crane
*Attorney, Agent, or Firm*—Morrison Law Firm

[57] ABSTRACT

A double scissors cutter for cutting a workpiece into substantially rectangular pieces is provided which comprises a pair of jaw members adapted to be opened and closed about a pivot shaft. Each of the jaw members includes, attached thereto, a cutting blade on an abutting surface thereof, the cutting blades being of a substantially U-shaped configuration. The cutting blades are arranged to be inter-engaged with each other with one of the cutting blades being positioned within the other of the cutting blades, so that a workpiece positioned between the cutting blades may be cut in a scissors cutting movement of the jaw members to form cutout pieces of a substantially rectangular configuration. Protuberant structure is carried on one of the jaw members and extends beyond a plane in which the cutting edge of the associated cutting blade lies. This protuberant structure makes first engagement with the workpiece being cut and deforms or bends the workpiece part being cut out thereby facilitating the following scissors cutting action of the jaw members. A through hole or aperture of a substantially rectangular configuration in a horizontal cross section is formed within the other of the cutting blades, this through hole being the passage by which cutout pieces discharge from the cutter.

3 Claims, 6 Drawing Sheets

FIG. 11
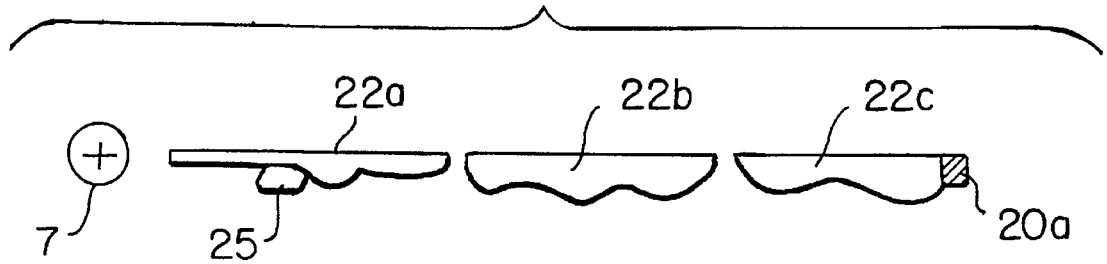
FIG. 12
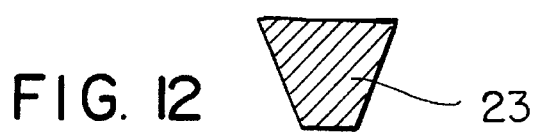
FIG. 13a   FIG. 13b   FIG. 13c
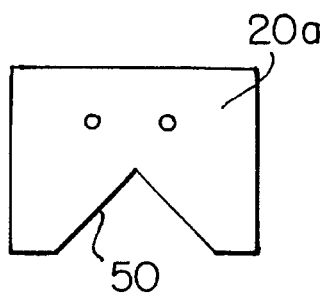 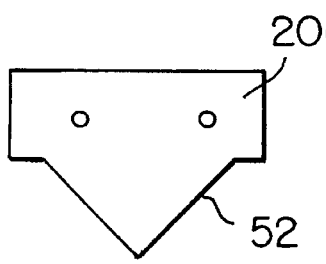 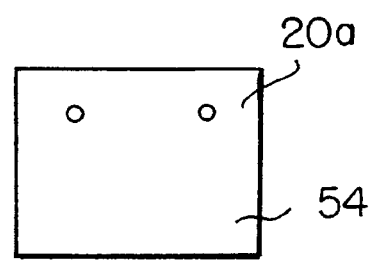
FIG. 14a   FIG. 14b   FIG. 14c
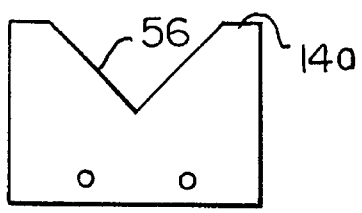 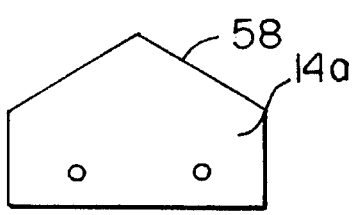 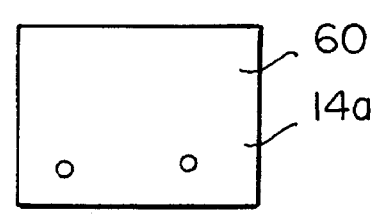
FIG. 15a   FIG. 15b
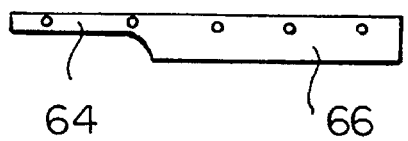 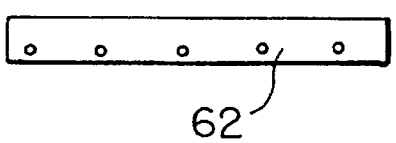

DOUBLE-SCISSORS CUTTER

This is a continuation-in-part of application Ser. No. 08/171,735 filed Dec. 22, 1993, now abandoned.

BACKGROUND OF THE INVENTION

The present invention relates to a cutter for cutting structural members of buildings, vehicles, or ships and the like into pieces for demolition. More particularly, the present invention relates to a double scissors cutter for cutting thick sections of steel plate, beams and bars.

A heavy-duty shearing machine such as, for example, one disclosed in U.S. Pat. No. 5,146,683, includes a pair of linear scissors blades pivotable with respect to each other at a pivot. It is well known that scissors-type devices suffer from transverse spreading of the blades when cutting thick and tough material. For example, when a pair of household scissors is used in an attempt to cut a stack of papers which exceeds their capacity, or when the cutting edges of the scissors are insufficiently sharp to cut the stack of papers, the blades deflect transversely, with the stack of papers ending up, uncut, between the blades. The blade-spreading problem with household scissors is amplified vastly in an industrial environment where steel members such as, for example, steel plate of an inch or more in thickness, or I-beams up to 18 or 24 inches in cross section, must be cut. In ship demolition, combinations of plate and beams are encountered in no particular order or aspect. The '683 cutter accommodates the changing aspect of the material to be cut by employing a rotary joint for rotating the cutting plane of the cutter blades, and a two-axis articulating joint for varying the angle at which the cutter approaches the material to be cut.

The two-axis articulating joint is typically a conventional joint found at the end of a power shovel boom. The rotary joint of the '683 cutter is attached outboard of the articulating joint.

The problem of blade spreading is recognized in the '683 cutter. In its solution, the '683 patent employs a beak-like projection on a transversely thinner one of the cutting blades. When such a shearing machine is used to cut a structural member or workpiece having a length larger than that of its blades, it is difficult to completely cut such structural member along it entire length due to the interference between the blades and the structural member.

In order to avoid this problem, a double scissors cutter has been proposed which comprises a pair of jaw members having, in their abutting surface, a cutting blade of a substantially U-shaped configuration such being disclosed in Japanese Patent Publication No. 05(1993)3224. This cutter is capable of cutting a workpiece into small pieces of a rectangular configuration, so that the blades can be easily advanced. Further, such small pieces of a rectangular configuration have substantially constant dimensions and weight, so that they may be easily handled and recycled.

It is noted, however, that the above double scissors cutter has a problem in that rectangular cutout pieces may remain between the jaw members. Accordingly, such cutter requires sweeping operation to remove cutout pieces from the abutting surface of the jaw members after each cutting operation, since no discharge mechanism for such cutout pieces is provided. Such sweeping operation is performed, for example, by opening the jaw members after completion of cutting work, and by shaking the cutter. Such sweeping operation is of course time-consuming and burdensome.

A cutter provided with a discharge mechanism for cutout pieces has been proposed. The discharge mechanism includes a steel plate connected through springs to an abutting surface of one of the jaw members, the plate serving to displace cutout pieces outwardly from the jaw member. Specifically, the springs disposed between the plate and the one jaw member are compressed when the jaw members are closed. When the jaw members are opened, the thus compressed springs extend to urge the steel plate outwardly, so as to displace the remaining cutout pieces from the jaw member. It is to be noted that such discharge mechanism is undesirable since it makes the cutter construction complicated. It is also noted that, when the jaw members are engaged with each other, significant amount of force is applied therebetween, thus causing a risk of damage to the springs. Furthermore, a portion of the power applied to the jaw members is consumed to compress the springs, thus increasing power loss.

OBJECTS AND SUMMARY OF THE INVENTION

Accordingly, it is an object of the invention to provide a double scissors cutter which overcomes the drawbacks of the prior art.

It is a further object of the invention to provide a double scissors cutter which operates in producing progressive cutting in scissor fashion to cut out rectangular pieces from heavy metal and like structures while at the same time deflecting the pieces being cut in manner as diminishes a cutout piece lateral envelope size enabling these cutout pieces to more freely pass from the cutter through a jaw member opening thereby preventing cutout piece clogging of the cutter.

It is a still further object of the invention to provide a simple and durable double scissors cutter for permitting automatic discharge of cutout pieces from the cutter.

Briefly stated, there is provided a double scissors cutter for cutting a workpiece into substantially rectangular pieces which comprises a pair of jaw members adapted to be opened and closed about a pivot shaft. Each of the jaw members includes, a cutting blade on an abutting surface thereof, the cutting blades being of a substantially U-shaped configuration. The cutting blades are arranged to be interengaged with each other with one of the cutting blades being positioned within the other of the cutting blades, so that a workpiece positioned between the cutting blades may be cut in a scissors cutting movement of the jaw members to form cutout pieces of a substantially rectangular configuration. Protuberant structure makes first engagement with the workpiece being cut and deforms or bends the workpiece being cut thereby facilitating the following scissors cutting action of the jaw members. A through hole or aperture of a substantially rectangular configuration in a horizontal cross section is formed within the other of the cutting blades, this through hole being the passage by which cutout pieces discharge from the cutter.

In accordance with these and other objects of the invention, there is provided a double scissors cutter comprising a pair of jaw members pivoted together on a pivot shaft at common jaw member ends. One of the jaw members has a rectangular aperture, the other jaw member being companionly configured with the aperture so that when the jaw members are closed in a scissors cutting movement said other jaw member can enter said aperture to bring a cutting edge carried thereon in cooperative cutting relationship with a cutting edge carried on the said one jaw member adjacent said aperture and thereby effect cutting of a piece from a work component in the course of said scissor movement. The cutting edges carried on said one and said other jaw members each are U-shaped and comprise opposite long side cutting edge parts and a short cutting edge part joining common ends of said long side parts. The long side cutting edge parts associated with the said other jaw member are disposed along opposite sides of this other jaw member. Protuberant structure is carried on said other jaw member and extends laterally between said other jaw member opposite sides and longitudinally substantially coextensively with the long side cutting edge parts associated therewith. The protuberant structure protrudes outwardly of a plane in which the cutting edges of the said other jaw member long side cutting edge parts lie, the protuberant structure having a longitudinal side contour profile of irregular undulating shape and comprising a bending member for applying a bending force to a work component part spanning the cutting edge long side cutting edge parts during the scissors cutting movement of the jaw members so as to deform a lateral expanse of said component part to a V-shaped configuration during cutting and thereby facilitating a passage of the cut piece through said aperture.

A further feature of the invention provides a double scissors cutter comprising a first jaw member and a second jaw member, the two jaw members being pivoted at common ends of each on a pivot shaft and arranged such that an inner face side of the first jaw member faces an inner face side of the second jaw member. The first jaw member is elongated and carries a U-shaped cutting edge at a lower perimeter part thereof, said first member cutting edge comprising parallel spaced apart long side cutting edge parts and a short cutting edge part transversely joining common ends of the long side cutting edge parts. The short cutting edge part is located at a first jaw member end opposite the pivoted end of said first jaw member. The second jaw member is laterally wider than the first jaw member and has a rectangular through aperture at the inner face thereof, the second jaw member carrying a U-shaped cutting edge comprising parallel spaced apart side cutting edge parts and a short cutting edge part transversely joining common ends of said second jaw member long side cutting edge parts. The second jaw member has stepped notch structure adjacent said aperture in which said second jaw member long side and short side cutting edge part are received. The first jaw member enters the second jaw member aperture when the jaw members are pivoted to a closing condition to bring the cutting edges of the jaw members into close adjacency with each other for effecting scissors cutting of a workpiece gripped between the jaw members. Protuberant structure is carried on the inner face side of the first jaw member and at least a major portion of said protuberant structure extends beyond said first jaw member inner face in the direction of said second jaw member inner face. The protuberant structure has an irregular height longitudinal side profile, said protuberant structure comprising a bending member for applying a bending force to the workpiece concurrent with the scissors cutting thereof.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 11 is an elevational showing depicting the side longitudinal profile of the block structures carried in the movable jaw member;

FIG. 12 is a sectional view showing of a block structure having a transverse profile in the configuration of an inverted trapezoid;

FIGS. 13a–13c depict various ones of the transverse face profiles that the short cutting edge part used on the movable jaw member can have;

FIGS. 14a–14c depict various ones of the transverse face profiles that the short cutting edge part used on the fixed jaw member can have; and FIGS. 15a and 15b show longitudinal side face profiles that can used on the long side cutting edge parts employed in the jaw members, the scale used in these Figures being smaller than used in any of the FIGS. 13 and 14 showings.

DETAILED DESCRIPTION OF THE PREFERRED EMBODIMENTS

Figure 1:
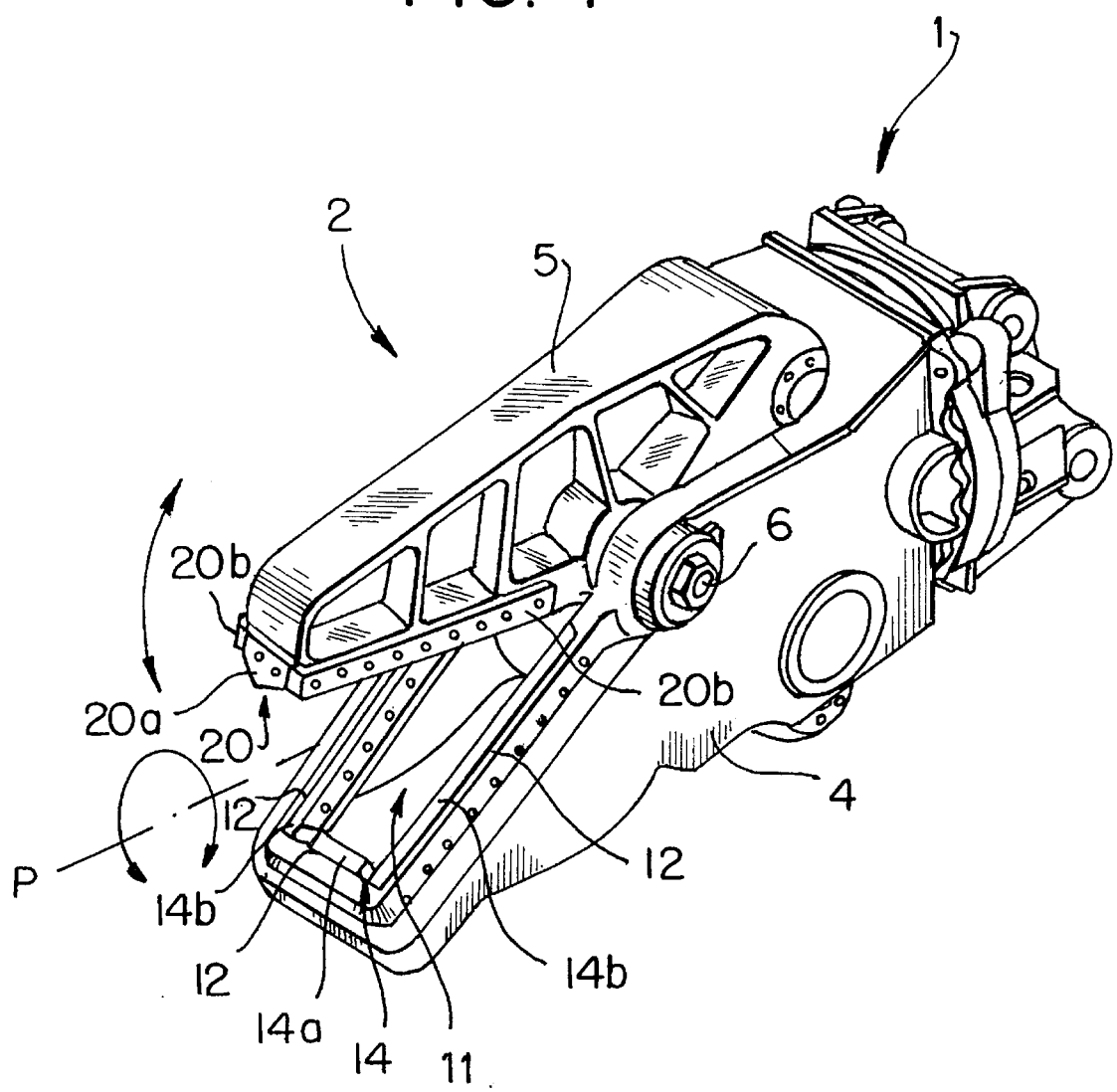
FIG. 1 is a perspective view of a double scissors constructed in accordance with the invention.

FIG. 1 shows a device of the invention in its entirety. The device, i.e., a double scissors cutter, includes a rotary bracket 1 and a main body 2 disposed forwardly of the rotary bracket 1. The rotary bracket 1 is connected to a forward end of an arm of a working machine, such as a power shovel (not shown), by means of a pin connection.

The rotary bracket 1 houses a hydraulic motor having an output shaft connected to the main body. When the hydraulic motor is actuated, the jaw-type cutter is rotated about the axis P depending on rotational direction of the hydraulic motor. Thus, the double scissors cutter may be selectively displaced to an appropriated position by means of extension or retraction movement of an arm of a power shovel, as well as reverse rotation of the hydraulic motor, depending on a position or orientation of a workpiece/component or piece of material to be cut.

The main body 2 includes a pair of jaw members 4, 5 arranged in a scissor-like fashion. The lower jaw member 4 is, at the rearward portion thereof, fixed to the rotary bracket 1 (the lower jaw member 4 will be referred to as a "stationary jaw" hereinbelow). The upper Jaw member 5 is pivotably connected to the stationary jaw 4 on a pivot shaft 6 (the upper jaw will be referred to as a "movable jaw" herein below).

Figure 2:
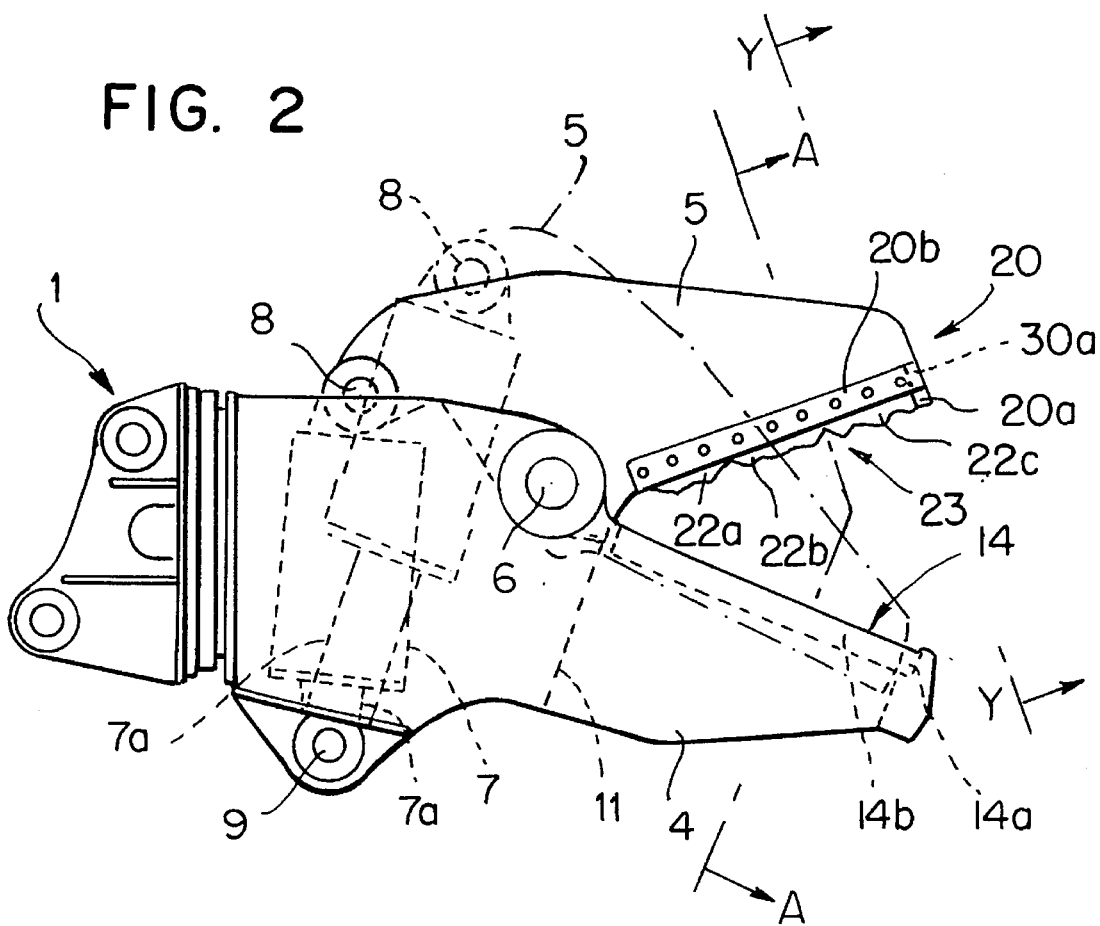
FIG. 2 is a side elevational view of the double scissors cutter of FIG. 1.

A hydraulic cylinder 7 is housed within the stationary jaw 4 as shown in FIG. 2. The cylinder end of the hydraulic cylinder 7 is pivotably connected to the movable jaw 5 by means of a piston pin 8 disposed rearwardly of the pivot shaft 6. A piston rod 7a of the hydraulic cylinder 7 is pivotably connected to a lower portion of the stationary jaw 4 by means of a rod pin 9. Thus, retraction or extension of the hydraulic cylinder 7 causes vertical movement of the movable jaw 5 about the pivot shaft 6, whereby the jaw members 4, 5 open and close in a scissor-like fashion.

The movable jaw 5, in its closed position, will be arranged so that the lower surface of an upper blade or cutting edge 20 (to be described below) of the movable jaw 5 is located at a position below the lower end surface of a lower blade 14, as shown by two-dot chain line in FIG. 2.

It is noted that the hydraulic cylinder 7 is arranged in a inverted manner, as shown in FIG. 2. This arrangement serves to prevent the-hydraulic cylinder 7 from being damaged upon contact or collision with structural members of a marine boat, for example, which might occur when the movable jaw 5 is closed (i.e., the cylinder 7 is extended). That is, and when the cylinder rod 7a is pivotably connected to the movable jaw 5 in a manner opposite to that shown in the drawings, the cylinder rod 7a will be exposed exteriorly, so that there may be a possibility for the rod 7a and seal portion thereof of less strength to be deformed or damaged upon contact or collision with structural members. On the contrary, and when the cylinder end is connected to the movable jaw 5, as shown in the drawings, it is only a rugged cylinder case the will be exposed exteriorly upon extension of the cylinder 7. Thus, the cylinder is protected, so as to maintain its integrity and/or function.

The stationary jaw 4 includes a through hole 11 of a rectangular cross-section when viewed in a horizontal plane. The through hole 11 extends from the abutting surface toward a lower portion of the stationary jaw 4. Grooves or stepped slots 12 are formed in the front surface, and side surfaces of the jaw 4 adjacent the aperture or through hole 11. A lower blade 14 of a substantially U-shaped configuration (the blade having two opposite arranged long side parts 14b and a short transverse part 14a connecting common ends of the long parts) is inserted in the grooves 12. These lower blade parts are removably secured to jaw 4 as with studs, screws or the like.

The through hole 11 includes a parallel portion 17 or first hole part of constant width enclosed by the front blade member 14a and side blade members 14b, and a second part 18 that laterally widens generally uniformly in the downward direction.

The movable jaw 5 is mounted, at the abutting surface thereof, with an upper blade 20 of a substantially U-shaped configuration. The upper blade 20, like the lower blade 14, includes a front blade member 20a and a pair of side blade members 20b. The blade members 20a, and 20b of the upper blade 20 are received in respective notches 30a, 30b formed in a lower surface of the movable jaw 5 at the sides and front thereof. The blade members are removably secured in the notches retained by means of bolts 34, for example. This is readily seen with reference to FIG. 8 wherein it is seen further that the securement of these elements is to a mounting unit body part 36 of jaw 5.

The blade members 20a, 20b it will be understood are arranged so that they pass in close adjacency with the blade members 14a, 14b in the course of scissors cutting movement of the jaw members thereby to effect work component cutting.

It is noted that the forward blade member 20a is formed into a substantially triangular configuration, as shown in FIG. 1. Thus, the front blade members 20a and 14a of the movable jaw 5 and stationary jaw 4, respectively, cooperate to cut or shear a workpiece or piece of material to be cut from its center to the opposite sides.

A series of block structures 22a–22c are arranged within the upper blade 20 along a longitudinal line, the said block structures extending laterally fully between the side blade parts 20b. Since the blade parts are received snug in the notches 30b there is no allowance that the blades can deflect sideways during scissors cutting movement.

Figure 3:
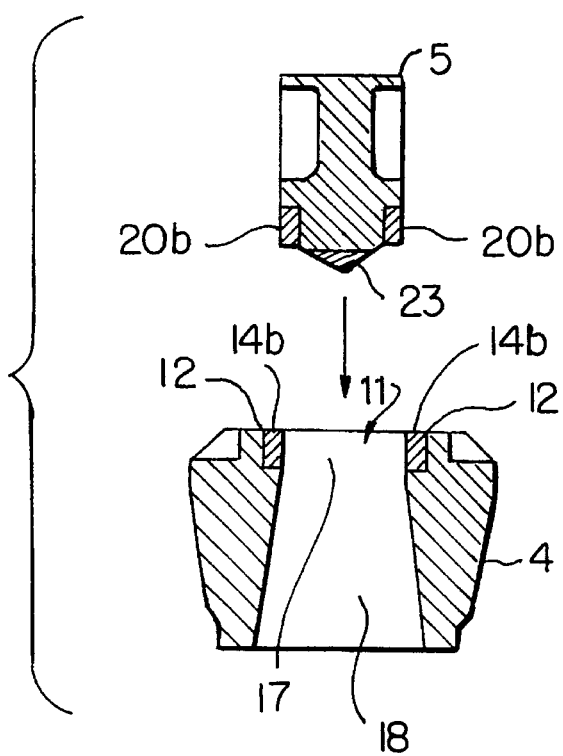
FIG. 3 is a vertical sectional view along line A—A of FIG. 2.

The block structures 22a, 22b, 22c present protuberant structure 23 extending from the lower surface (cutting surface) of the upper blade 20 to a point below that lower surface. The protuberant structure 23 has an irregular undulating longitudinal side profile, as shown in FIGS. 2 and 11. The protuberant structure 23 can have a triangular transverse profile as shown in FIG. 3, or such can be of the convex configuration depicted in FIG. 4, or even of the inverted trapezoidal shape shown in FIG. 12.

Figure 4:
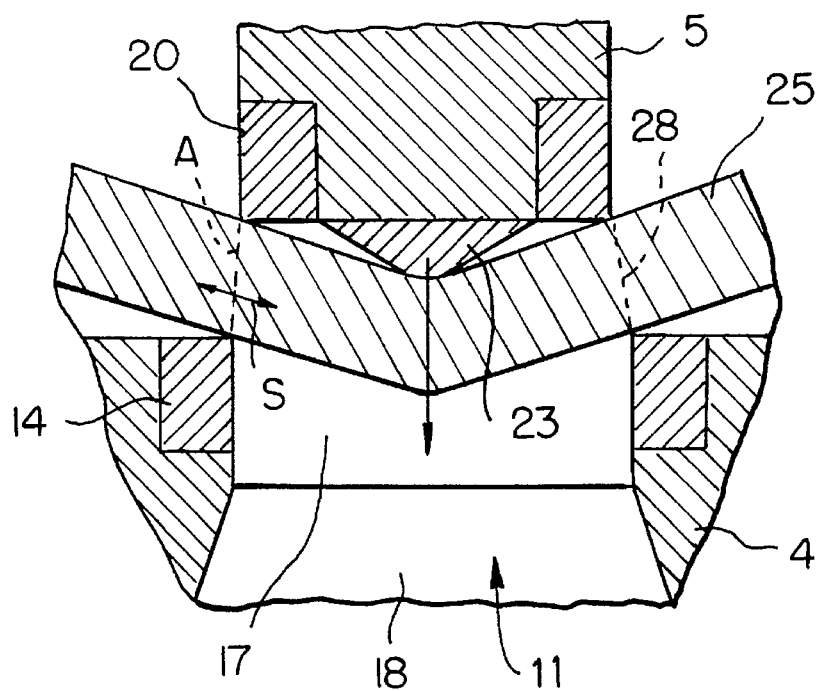
FIG. 4 is an enlarged sectional view illustrating cutting operation of the double scissors cutter.

When the hydraulic cylinder 7 is extended to close the movable jaw 5, it is the protuberant structure 23 which first engages workpiece 25, so as to displace or deflect the workpiece 25 (i.e., the workpiece part that will become a cutout piece) downwardly, whereby the workpiece is deformed into a substantially V-shaped configuration, as shown in FIG. 4. Then, the upper and lower blades 20, 14 are inter-engaged in cooperative scissors cutting movement, so that the workpiece 25 is cut along laterally spaced lines to form a rectangular cutout piece.

Figure 5:
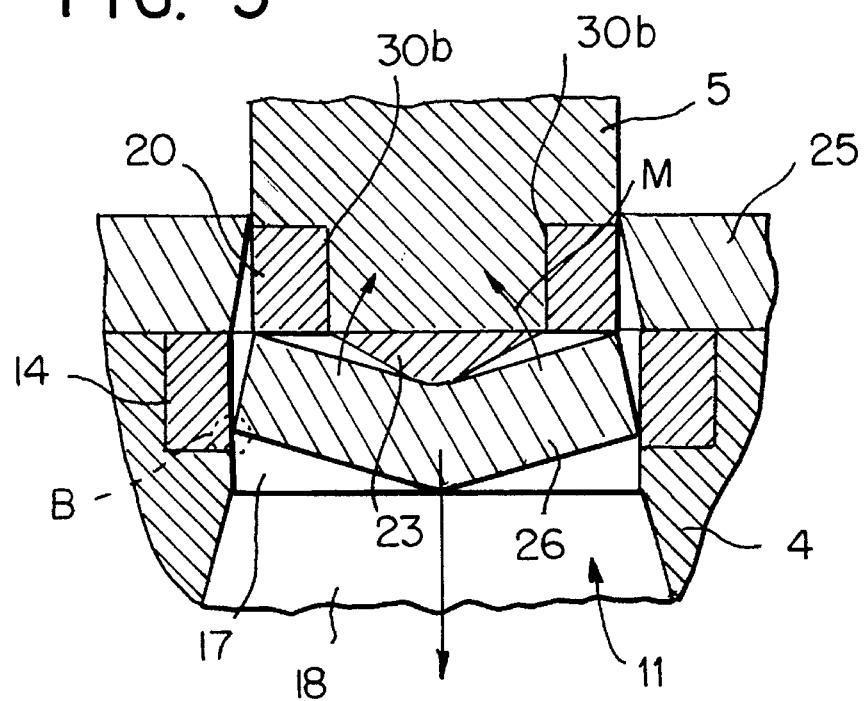
FIG. 5 is an enlarged sectional view illustrating the double scissors cutter just after completion of cutting operation.

When the movable jaw 5 is further closed as shown in FIG. 5, the cutout piece 26 is displaced downwardly by means of the protuberant structure into the hole 11. This is a deflection of the workpiece so that a section of the workpiece corresponding to what will be a cutout piece, has its lateral envelope slightly diminished. With the following shearing of the workpiece by the cutting jaws, the diminished lateral width workpiece readily passes through the parallel portion 17 of the through hole 11 and into the diverging or tapered portion 18.

The cutout piece 26 having reached the diverging portion 18 falls through the diverging portion 18 by gravity and is discharged from the lower opening. Then, the hydraulic cylinder 7 is retracted to return the movable jaw 5 to the initial position for repetition of the above procedure. It should be noted that, even if the through hole 11 were to clog with a cutout piece 26, such cutout piece will be displaced through the through hole 11 by means of a new or next cutout piece.

In accordance with the invention, cutout pieces 26 produced by the upper and lower blades 20, 14 are automatically discharged from the stationary jaw 4 through the through hole 11, so that no cutout pieces may remain between the upper and lower jaw. Accordingly, continuous and efficient cutting operation may be realized.

The cutter of the invention is not complicated in construction, since it includes no additional mechanical components, except for the through hole 11 and protuberant structure 23. It is also noted that the cutter of the invention withstands compression force generated between the jaw members 4, 5 upon engagement thereof, thus providing a high durability. It is noted further that cutout pieces 26 may be discharged or expelled smoothly by reason of the diverging through hole 11.

Figure 6:
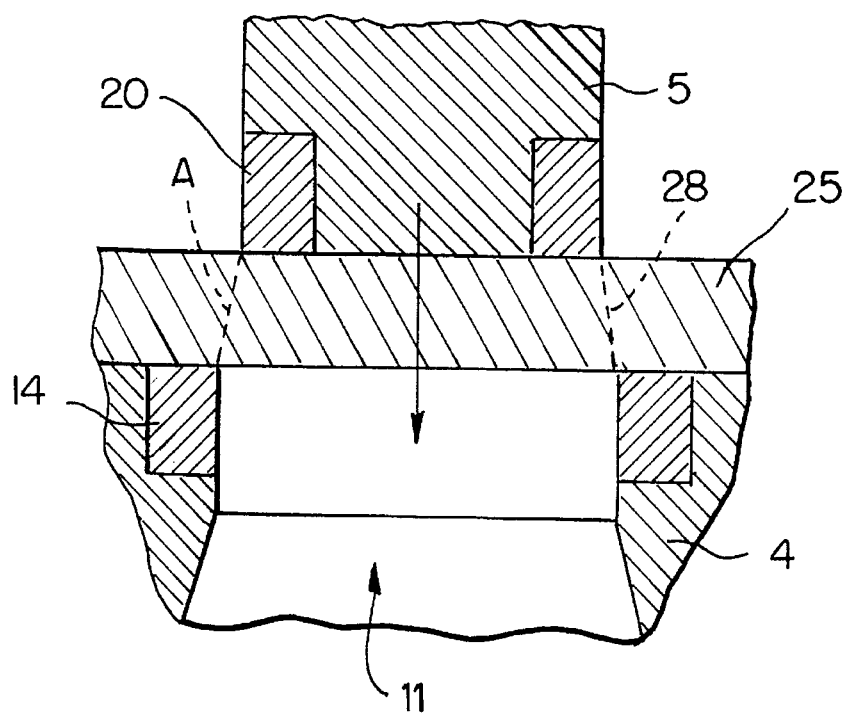
FIG. 6 is an enlarged sectional view illustrating cutting operation of a double scissors cutter having no protuberant structure.
Figure 7:
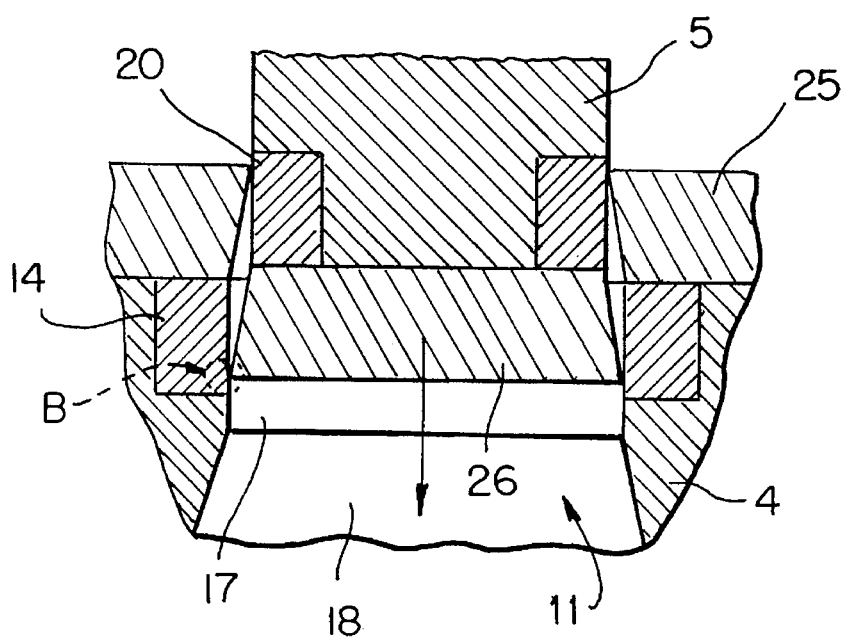
FIG. 7 is an enlarged sectional view illustrating a double scissors cutter having no protuberant structure just after completion of cutting operation.

Furthermore, the cutter of the invention, which includes the protuberant structure 23, in addition to the through hole 11, provides the particular advantages noted as a) and b) below over a jaw cutter which includes the through hole 11 but has no protuberant structure 23.

a) A reduced power is required for initial cutting operation for the reason below:

With a cutter having protuberant structure 23, the workpiece 25 is deformed into a substantially V-shaped configuration, as shown in FIG. 4. Accordingly, only corner portions or edges of the blades. 14, 20 engage with the workpiece, thus causing a notch effect in such engaged area. This enables the cutter to cut the workpiece 25 with a reduced power. A tensile stress S, in addition to shearing stress, is also created in broken area A of the workpiece, since the workpiece 25 is deformed into a substantially V-shaped configuration. This also contributes to reduction of power required. When a cutter without protuberant structure 23 is used, the blades 14, 20 are contacted with the workpiece through the entire width thereof as shown in FIG. 6, thus causing no notch effect. Consequently, only a shearing force is exerted in the broken area of the workpiece and no tensile stress mentioned above produced.

b) cutout pieces 26 from the workpiece are smoothly forced into the diverging portion 18 without causing blockage or clog of the parallel portion 17 for the reason that:

With a cutter having no protuberant structure 23, the portion B of the cutout piece 26 may cause frictional engagement with the lower blade 14, thus causing a risk of clogging as shown in FIG. 7. When protuberant structure 23 is provided, a bending moment M is exerted by the protrusions upon closing operation of the movable jaw 5, as shown by the arrow in FIG. 5. Accordingly, the cutout piece 26, when caught to the inner wall of the through hole, may be deformed into a V-shaped configuration by reason of such bending moment so that it may easily pass through the through hole.

Figure 8:
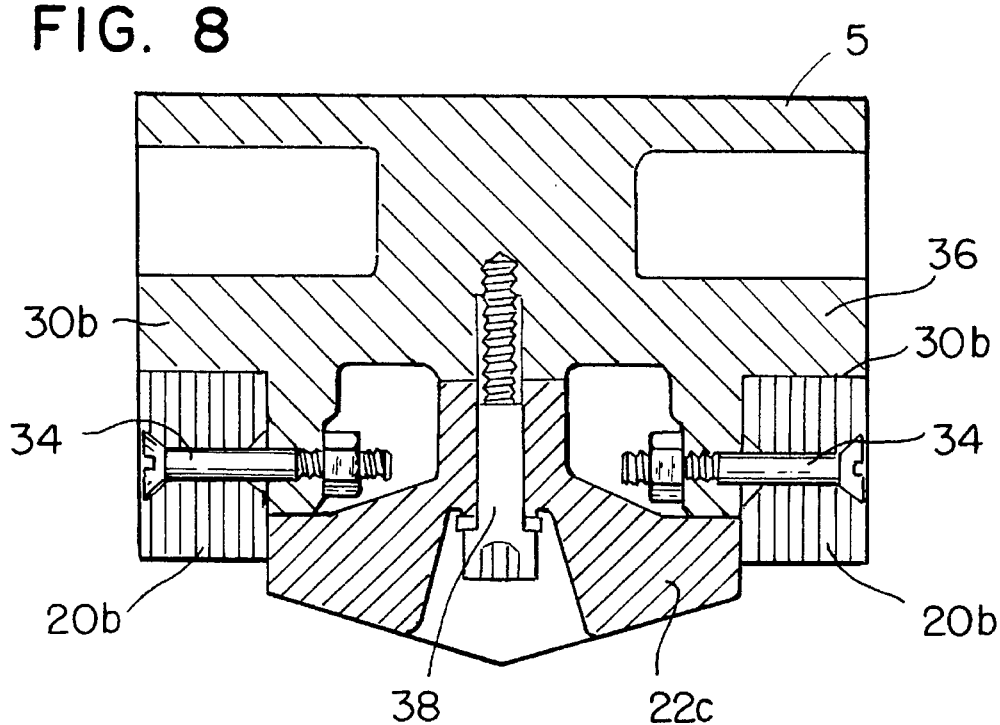
FIG. 8 is a transverse sectional view on greatly enlarged scale taken on the line Y—Y in FIG. 2.
Figure 10:
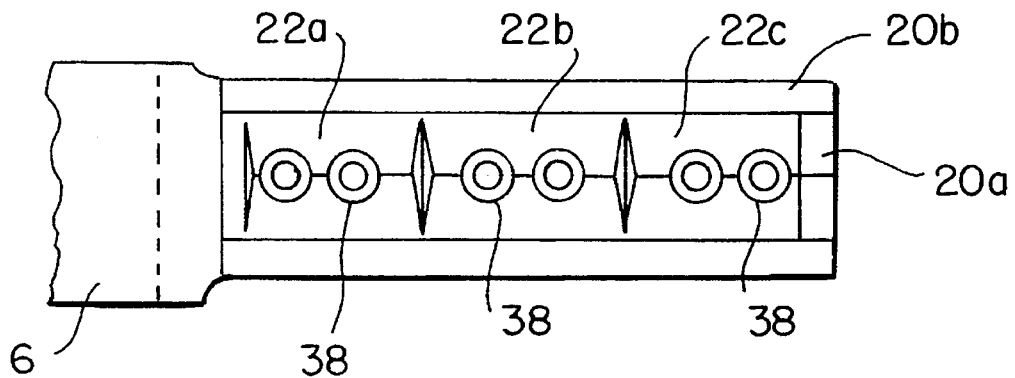
FIG. 10 is a plan view of an underface of the movable jaw member depicting a manner of securing the plural block structures to the movable jaw member mounting body.

Advantages of the use of structure blocks 22a, 22b and 22c as the protuberant structure workpiece bending member include the ease and facility for installation and replacement of same in the upper jaw member 5. Referring to FIGS. 8 and 10, it is seen that the respective ones of these longitudinally aligned blocks is removably and independently secured to the mounting body 36 of jaw member 5 with fasteners 38 such as screws. This allows easy replacement of any one or all of the blocks. The blocks are of necessity and because of the rugged character of the cutter and the nature of workpieces to be cut therewith, quite heavy. Using plural aligned blocks lessens the weight that must be handled by mechanics effecting block change.

As seen particularly in FIG. 11, the block structures 22a, 22b and 22c have an undulating longitudinal side profile. Use of such undulating profile is advantageous in enhancing the gripping action with which the jaw members can grip a workpiece 25 during cutting. It also is advantageous to provide a length part of the block structure 22a most proximal the pivot shaft 7 with a straight run to facilitate initial grip of the workpiece incident the scissors cut operation.

Figure 9:
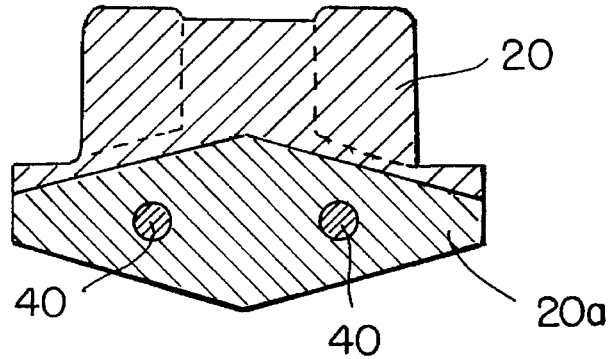
FIG. 9 is a transverse sectional view taken through the short side cutting edge part of the movable jaw member and illustrating the manner of removably securing the said short side cutting edge part to the movable jaw member mounting body.

FIG. 9 shows removable connection of the forward or front cutting edge part 20a to the jaw member 5, these being effected, e.g., with threaded studs 40 that secure the part 20a to the mounting body 36 of jaw member 5, heads of these studs not being shown in FIG. 9.

The long side cutting edge parts 20b and 14b, and the short transverse cutting edge parts 20a and 14b used in the jaw members 4 and 5 can be given various configurations for reasons, for example, to optimize cutting the rugged structural workpieces encountered in use of the cutter as well as to reduce stress imposition on the cutter and its components incident the cutting. Such configurations are described next.

Referring to FIGS. 13a–13c, the short cutting edge part used with movable jaw 5 can have a configuration such that the part has a transverse face profile including an inverted Vee notch 50 which when mounted on the jaw member 5 faces toward the jaw member 4 as seen in FIG. 13a. FIG. 13b shows a profile which includes a Vee projection 52 facing toward jaw member 4, and FIG. 13c shows that the face profile of the short cutting edge part 54 can be rectangular.

The profiles of the short cutting edge parts which can be used with the fixed jaw member 4 include a Vee notch 56 facing toward the movable jaw 5 (FIG. 14a), A Vee projection 58 facing toward jaw member 5 (FIG. 14b) and the rectangular face profile 60 shown in FIG. 14c.

Configurations of the long side cutting edge parts useable in the jaw members are show in FIGS. 15a and 15b. These include a long side cutting edge part 20b, 14b that is elongated and of substantially uniform height as at 62 (FIG. 15b). On the other hand, the FIG. 15a configuration of long side cutting edge part shows that same is elongated and has a first length part 64, i.e., part most proximal the shaft pivot which is of uniform height while a second length part 66 distal the pivot shaft is of a second uniform height greater than the height of first length part 66.

While the long side cutting edge parts of the depicted configurations can be interchangeably used on the jaw members, it has been determined that the most effective and best stress minimizing combination to use is that wherein the FIG. 15a edge part is used on the movable jaw member 5, and the FIG. 15b part be used on the fixed jaw member. In like fashion of using an optimized combination and in respect of the short cutting edge parts, the preferred combination for use is the FIG. 13a part on the jaw member 5, and the FIG. 14c part on fixed jaw member 4.

The invention is not limited to the above construction and may take various forms. For example, the lower jaw 4 and upper jaw 5 may be constructed to be movable and stationary, respectively. The protuberant structure 23 may take various configurations other than the above, provided that they are capable of deforming the workpiece 26 into a curved configuration.

As mentioned above, cutout pieces produced by the blades are automatically discharged exteriorly through the through hole located within one of the blades. Thus, no cutout pieces remain as between the pair of jaws. Accordingly, it is possible to perform efficient and constant cutting operation without requiring complicated mechanical construction for discharging cutout pieces.

The provision of protuberant structure in addition to the through hole also contributes to reduction of power required and smooth discharge of cutout pieces from the cutter. Accordingly, the invention provides a jaw-type cutter of relatively simple construction having a high durability which may automatically discharge cutout pieces.

Smooth discharge of cutout pieces may be facilitated when the through hole is formed in a diverging manner.

It is possible to protect the hydraulic cylinder from contacting structural members of marine boats, for example, by pivotably connecting the piston rod of the hydraulic cylinder to the stationary jaw member and by pivotably connecting the cylinder end to the movable jaw member at a position rearwardly of the pivot shaft. Thus, stable function of the cylinder may be maintained for a prolonged time of use.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A double scissors cutter comprising a pair of jaw members pivoted together on a pivot shaft at common jaw member ends, one of said jaw members having a through hole, the through hole having a rectangular aperture, the other jaw member being companionly configured with said aperture so that when said jaw members are closed in a scissors cutting movement said other jaw member can enter said through hole to bring a cutting edge carried thereon in cooperative cutting relationship with a cutting edge carried on the said one jaw member adjacent said aperture and thereby effect cutting of a piece from a work component in the course of said scissor movement, the through hole widening from a width thereof at said aperture to a larger width distal said aperture, the cutting edges carried on said one and said other jaw members each being U-shaped and comprising opposite long side cutting edge parts and a short cutting edge part joining common ends of said long side parts remote from the location of the pivoted ends of the jaw members, the long side cutting edge parts associated with said other jaw member disposing along opposite sides of other jaw member, and protuberant structure comprising a plurality of longitudinally aligned structure blocks carried on said other jaw member and extending laterally fully between said other jaw member opposite long side cutting edge parts and longitudinally substantially coextensively with the said long side cutting edge parts, each of said blocks being independently removably secured to said other jaw member, said protuberant structure protruding outwardly of a plane in which the cutting edges of the said other jaw member long side cutting edge parts lie, said protuberant structure having a longitudinal side contour profile of irregular undulating shape and comprising a bending member for applying a bending force to a work component part spanning the cutting edge long side cutting edge parts during the scissors cutting movement of the jaw members so as to deform a lateral expanse of said component part to a V-shaped configuration during cutting and thereby facilitating a passage of the cut piece through said through hole, a length of the structure block most proximal the pivoted ends of the jaw members being of substantially straight longitudinal side contour and less protruding than the structure of any other structure block to provide therewith enhanced initial gripping of the work component during cutting.

2. A double scissors cutter in accordance with claim 1 in which a transverse profile of the protuberant structure is one of a triangular shape, a convex shape and an inverted trapezoid.

3. A double scissors cutter comprising a first jaw member and a second jaw member, the two jaw members being pivoted at common ends of each on a pivot shaft and arranged such that an inner face side of the first jaw member faces an inner face side of the second jaw member, the first jaw member being elongated and carrying a U-shaped cutting edge at a lower perimeter part thereof, said first jaw member cutting edge comprising parallel spaced apart long side cutting edge parts and a short cutting edge part transversely joining common ends of the long side cutting edge parts, the short cutting edge part being located at a first jaw member end opposite the pivoted end of said first jaw member, the second jaw member being laterally wider than the first jaw member and having a rectangular through aperture at the inner face thereof, the second jaw member carrying a U-shaped cutting edge comprising parallel spaced apart side cutting edge parts and a short cutting edge part transversely joining common ends of said second jaw member long side cutting edge parts, the second jaw member having stepped notch structure adjacent said aperture in which said second jaw member long side and short side cutting edge part are received, the first jaw member entering the second jaw member aperture when the jaw members are pivoted to a closing condition to bring the cutting edges of the jaw members into close adjacency with each other for effecting scissors cutting of a workpiece gripped between the jaw members, and protuberant structure comprising a plurality of longitudinally aligned blocks carried on the inner face side of the first jaw member and extending laterally fully between the long side cutting edge parts of said first jaw member, the said blocks being independently removably secured to said first jaw member, at least a major portion of said protuberant structure extending beyond said first jaw member inner face in the direction of said second jaw member inner face, the protuberant structure having an irregular height longitudinal side profile, said protuberant structure comprising a bending member for applying a bending force to the workpiece concurrent with the scissors cutting thereof, a block length most proximal said pivot shaft having a straight run thereby to facilitate initial grip therewith of the workpiece, the first jaw member short cutting edge having a transverse face profile including an inverted Vee notch facing toward the second jaw member, the long side cutting edge parts carried on said first jaw member being elongated and having a first length most proximal said pivot shaft which is a first uniform height and a second length distal said pivot shaft which is of a second uniform height greater than the height of the first length, the short cutting edge part carried on said second jaw member having a transverse face profile which is rectangular, and the long side cutting edge parts carried on said second jaw member being elongated and of substantially uniform height.

* * * * *